United States Patent
Nahill et al.

[19]

[11] Patent Number: 6,112,925

[45] Date of Patent: Sep. 5, 2000

[54] ENHANCED SHELF-LIFE PRESSURIZED CONTAINER WITH RIBBED APPEARANCE

[75] Inventors: Thomas E. Nahill, Amherst; Suppayan M. Krishnakumar, Nashua; Wayne N. Collette, Merrimack, all of N.H.

[73] Assignee: Continental PET Technologies, Inc., Florence, Ky.

[21] Appl. No.: 08/803,976

[22] Filed: Feb. 21, 1997

[51] Int. Cl.[7] ............................ B65D 1/02; B65D 1/42; B65D 23/06

[52] U.S. Cl. .................... 215/382; 215/381; 220/671; 220/672; 220/675

[58] Field of Search .................... 215/382, 381; 220/672, 673, 675, 671

[56] References Cited

U.S. PATENT DOCUMENTS 4,890,757  1/1990  Robbins, III ........................ 220/72

FOREIGN PATENT DOCUMENTS

| | | |
|---|---|---|
| 2944160 | 5/1980 | Germany . |
| 8-207920 | 8/1996 | Japan . |
| WO 94/26498 | 11/1994 | WIPO . |
| WO 96/13436 | 5/1996 | WIPO . |

*Primary Examiner*—Sue A. Weaver
*Attorney, Agent, or Firm*—Wolf, Greenfield & Sacks, P.C.

[57] ABSTRACT

Pressurized plastic container having the appearance of ribs but with substantially reduced creep and without delamination, i.e., having an enhanced shelf life compared to prior art ribbed containers. In multilayer containers, the scribe lines reduce delamination of the layer structure so as to avoid loss of transparency and/or barrier properties. The reduction in creep is particularly useful for smaller volume containers having a greater surface area to volume ratio.

44 Claims, 6 Drawing Sheets

ENHANCED SHELF-LIFE PRESSURIZED CONTAINER WITH RIBBED APPEARANCE

FIELD OF THE INVENTION

The present invention is directed to pressurized plastic containers, such as transparent polyester carbonated beverage containers, and more particularly to such containers having the appearance of ribs but having a reduced tendency to creep and/or delaminate.

BACKGROUND OF THE INVENTION

Transparent polyester carbonated beverage containers are in wide-spread use around the world and have largely replaced prior art glass containers for soft drink beverages. The plastic containers are substantially lighter in weight, and shatter resistant. The polyester most commonly used, polyethylene terephthalate (PET), provides superior clarity, recyclability, and ease of manufacture at a competitive price.

Despite substantial uniformity in the material used to make plastic carbonated beverage containers, each beverage manufacturer would like to distinguish the visual appearance of their bottle from competitors' bottles. One way to accomplish this is by applying a distinctive label to the container. Another way is to customize the contour of the container itself to provide a distinguishable visual appearance that consumers learn to recognize. Ribs are one feature that can be utilized in almost endless variations, to customize the look of a container. The ribs may be singular, plural, extend radially inwardly or outwardly with respect to the container circumference, and otherwise form patterns which distinguish the container. The ribs may also provide structural reinforcement to prevent buckling of the container.

One problem with prior art contour ribs in pressurized containers is their tendency to "creep" (move) under pressure. This produces an increase in container volume and an undesirable pressure loss in the carbonated beverage. The problem of creep is illustrated for two prior art containers in FIGS. 1–4. Both are representative of known transparent PET carbonated beverage containers of ½-liter volume, one having internal ribs and the other external ribs.

Figure 1:
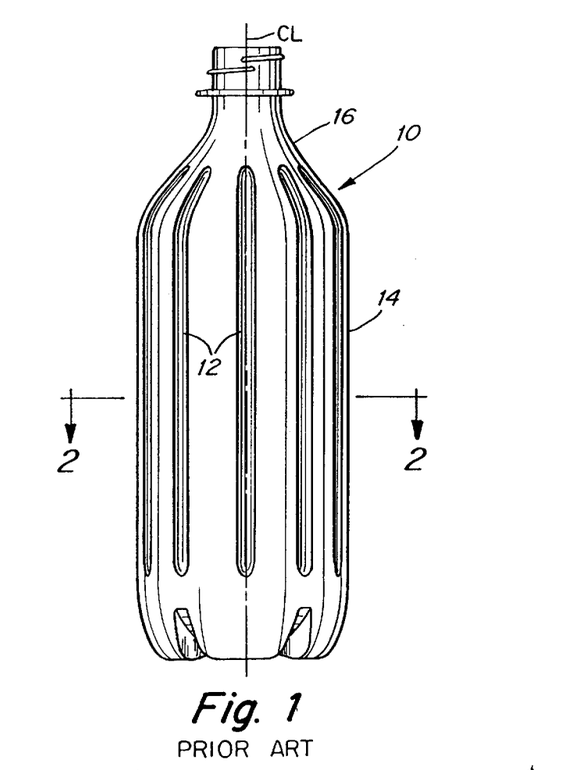
FIG. 1 is a front elevational view of a prior art container with recessed ribs.
Figure 2:
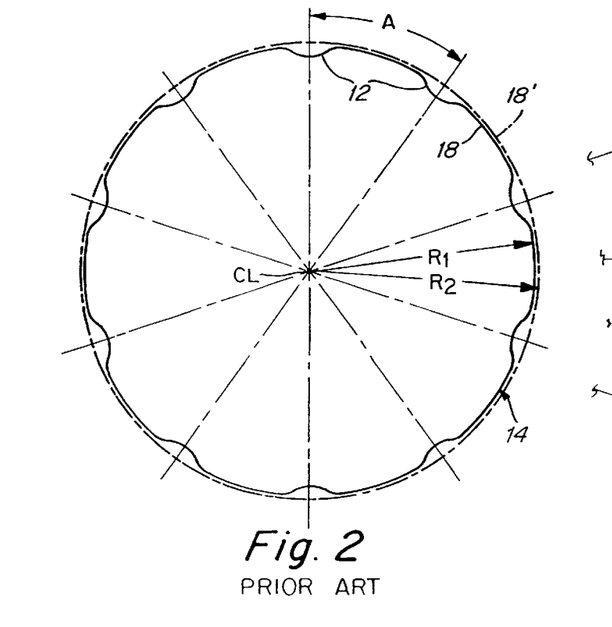
FIG. 2 is a schematic cross-sectional plan view taken along line 2—2 of FIG. 1, showing the panel circumference before (solid line) and after (dashed line) filling with a carbonated liquid.

FIG. 1 shows prior art container 10 having ten vertically-disposed ribs 12 in panel 14 and shoulder 16 sections. The ribs extend radially inward (are recessed) from container circumference 18, as shown in FIG. 2 (a cross-section through the panel portion 14). The solid line in FIG. 2 is the panel circumference 18 after blow molding, and prior to filling with a carbonated beverage. The ten relatively large-radius ribs 12 are symmetrically disposed about the panel circumference 18, which is defined by radius $R_1$ (radial distance from vertical centerline CL of the container). After filling, the panel undergoes creep in a radially outward direction, such that the originally inwardly extending ribs tend to flatten out about the circumference (i.e., the ribs are substantially eliminated) and the panel forms a substantially cylindrical panel circumference 18' having a radius $R_2$, which is somewhat greater than $R_1$. This is clearly undesirable from the viewpoint of the beverage company for at least two reasons. First, the container is losing a significant contour feature which is intended to distinguish this company's container from other containers in the marketplace. Secondly, the increase in container diameter produces a resulting volume increase in the container, which leads to a lower pressure in the headspace, i.e., the volume of pressurized air above the liquid in the top end of the container. This reduction in headspace pressure causes gas in the pressurized liquid (carbonation) to leave the liquid and enter the headspace, resulting in an undesirable drop in the carbonation level. The beverage company would like to maintain tight control over the carbonation pressure in order to deliver an optimum product to the consumer. In this regard, the company establishes a shelf life for its product, which specifies a maximum loss in carbonation pressure over time. In effect, the volume increase due to expansion of the ribs reduces the shelf life of the product. This increases the cost to the manufacturer in that he now must either sell the product in a shorter time period or replace expired product with fresh product on the retail store shelves.

Figure 2A:
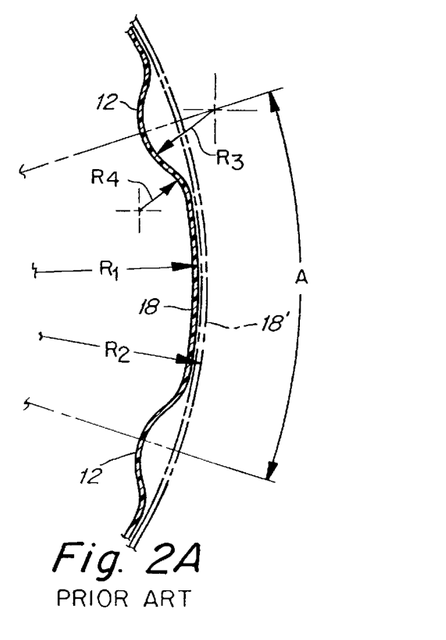
FIG. 2A is an enlarged fragmentary cross-section of a portion of the panel section seen in FIG. 2.

FIG. 2A is an enlarged fragment of the panel cross-section, showing more clearly the original outer panel circumference 18 at $R_1$, and the enlarged outer panel circumference 18' at $R_2$ after filling. The angular extent A between ribs 12 is defined as a circumferential distance in degrees between the center points of two adjacent ribs. Each rib is defined by a relatively large radius $R_3$, e.g., 0.100 to 0.200 inches (0.254 to 0.508 cm). A smaller blend radius $R_4$ smoothly connects the opposing edges of the rib to the container circumference 18.

Figure 3:
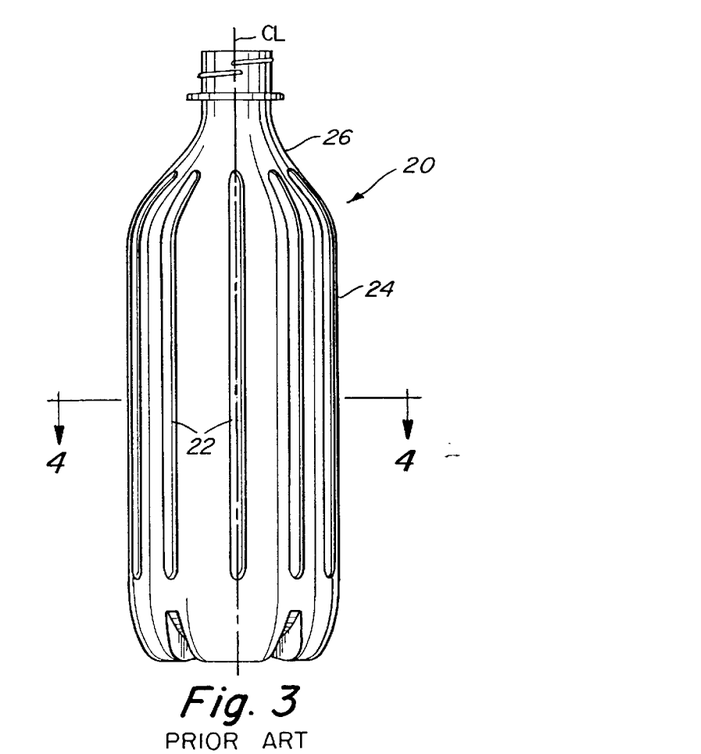
FIG. 3 is a front elevational view of a prior art container with protruding ribs.
Figure 4:
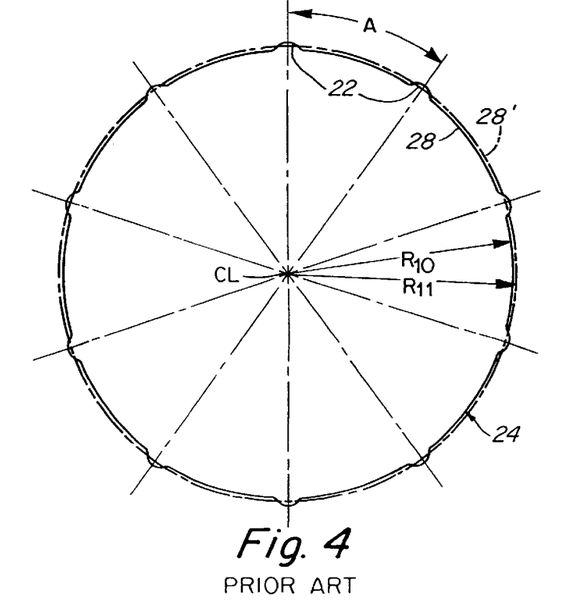
FIG. 4 is a schematic cross-sectional plan view taken along line 4—4 of FIG. 3, showing the panel circumference before (solid line) and after (dashed line) filling with a carbonated liquid.
Figure 4A:
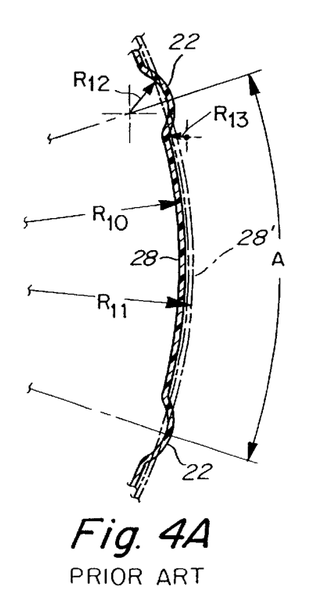
FIG. 4A is an enlarged fragmentary cross-section of a portion of the panel section seen in FIG. 4.

FIGS. 3–4 show an alternative prior art container 20 which is the same as the first container (of FIGS. 1–2) but wherein vertical ribs 22 extend radially outwardly (protruding), rather than inwardly. Note that like features are given similar reference numbers with respect to the first container, but in a range of 20–29 as opposed to 10–19. In this embodiment, the original panel circumference 28 is at $R_{10}$. After filling, the panel circumference 28' has experienced a net overall radial increase to $R_{11}$, with the ribs again flattening out about the circumference. Again, each rib has a relatively large radius $R_{12}$, and a relatively small blend radius $R_{13}$.

Another significant problem caused by rib movement in prior multilayer pressurized containers is delamination. Often, a manufacturer would like to provide a multilayer wall in some portion or all of the container, in order to influence the overall cost of materials, thermal resistance, barrier properties (e.g., loss of $CO_2$ and/or ingress of oxygen), processibility, etc. In particular, smaller sized containers, having a high surface area to volume ratio, often cannot be produced with an acceptable shelf life unless a barrier layer is included. However, in multilayer pressurized containers with rib contours, when the ribs move under pressure (creep) so as to substantially flatten out about the panel circumference, this often produces delamination (separation) of the layers. Layer separation is undesirable as it may lead to loss of transparency, structural weakness, loss of barrier properties, etc. Layer separation can be a particular problem in multilayer containers without chemical bonding or adhesives to bind the layers, e.g., recyclable containers wherein relatively weak diffusion or hydrogen bonding maintains the layer structure during use, but enables ready separation when cut (during the recycling process).

Thus, there is need for a pressurized container for carbonated beverages and the like which can be customized, but which avoids the above problems of pressure loss and delamination.

SUMMARY OF THE INVENTION

The present invention is directed to a method of making and a resulting pressurized plastic container having the visual appearance of ribs, but which resists creep. The use of wide-width ribs which exhibit creep under pressure are avoided, and replaced instead with one or a plurality of "scribe" lines. A scribe line is a thin projecting band or molding formed in a blow mold by expanding a polymer preform or parison into a narrow recess (groove) which has been cut ("scribed") into the wall of the mold cavity. The polymer may fill all or a portion of the groove. Alternatively, a scribe line may be formed by expanding the polymer over a narrow raised band formed on the cavity wall, to produce a recessed scribe line in the container.

The scribe lines can withstand pressurization, with a significant reduction in creep, and resist delamination in multilayer containers. They can thus provide a visual appearance of a rib, but provide superior performance in pressurized applications, particularly in smaller volume containers, where creep can be a significant problem.

By way of example, three parallel scribe lines placed in relatively close proximity provide the visual appearance of a relatively deep contour rib. Providing the scribe lines in a substantially vertical position on the container, and tapering the upper and lower ends of the scribe lines to form substantially rounded end portions, produces a visual effect similar to a relatively deep contour rib, but without the coinciding problems of creep, pressure loss and/or delamination of the prior art contour ribs.

As an example of creep reduction, a commercial ½ liter (500 cubic centimeters) disposable carbonated beverage container with ribs was carbonated at 4 volumes $CO_2$ and held at 38° C. for 24 hours. It exhibited a diameter increase (in the panel section having ribs) of 2.2%—producing a significant reduction in carbonation over this short time period. In contrast, a ½ liter container of similar dimensions but having scribe lines instead of ribs, had only a 1.2% diameter increase under the same conditions. This is a significant improvement in terms of extending shelf life.

Loss of pressurization becomes an increasing problem with increasing surface area to volume ratio. Thus, the present invention is particularly useful in providing a pressurized plastic container having a surface area to volume ratio of at least about 720 $cm^2/L$ (centimeters squared per liter), with a carbonation loss of no greater than 17.5% over a period of 90 days. This surface area to volume ratio is typical for relatively small containers having volumes of ½ liter (L) or less. In a multilayer container of similar size, the 17.5% maximum carbonation loss may be achievable over a period of 120 days, or longer.

The wall thickness of the container may have an important effect on the amount of pressure loss over time for certain container designs. It is thus another aspect of the present invention to provide a pressurized plastic container having a plurality of scribe lines of a narrow width W which give a visual appearance of ribs, in a container portion having a wall thickness T, and wherein a ratio of W:T is in the range of from about 1.5:1 to 3.0:1.

The monolayer or multilayer containers of this invention are generally transparent and a major polymer component will typically be a polyester, such as polyethylene terephthalate (PET) and/or polyethylene naphthalate (PEN), including homopolymers, copolymers and blends thereof. In a multilayer container, PET and/or PEN polymers commonly form exterior inner and outer layers, with one or more internal layers of recycled polymer (such as post-consumer PET), a $CO_2$ and/or $O_2$ barrier layer, a thermal resistant layer, etc. Recyclable multilayer containers are made from these polymers with diffusion or hydrogen bonding to maintain the layer adhesion during use (as opposed to adhesives or chemical bonding). Scribe lines are particularly useful in such recyclable containers to avoid delamination.

Thin-walled (manually flexible) containers made from polyesters and other strain-orientable polymers typically have a wall thickness in a panel section in a range of from 0.008 to 0.016 inches (0.020 to 0.040 cm), wherein the panel section has been biaxially oriented at an average stretch ratio in a range from 10:1 to 18:1. In such containers, the individual scribe lines may have a width in a range of from about 0.012 to 0.040 inches (0.030 to 0.100 cm). The scribe lines may have a radial depth, extending outwardly from the outer panel circumference (or alternatively extending radially inwardly from the inner panel circumference) of from about 0.001 to 0.010 inches (0.00254 to 0.0254 cm). Three closely-spaced and substantially-parallel scribe lines provide a particularly pleasing visual appearance; the three-line set may have an angular extent, measured as a distance between the center points of the two outermost lines, in a range of from about 3 to 10°.

The scribe lines may be provided in various patterns of one or more lines, with various alignments (vertical, horizontal, diagonal), and with various spacings between the lines, to provide an almost infinite variety of customized detailing on a given container.

These and other advantages and features of the present invention will be more particularly described with respect to the following detailed descriptions.

BRIEF DESCRIPTION OF THE DRAWINGS

FIG. 6A' is an enlarged fragmentary cross section of a portion of a panel section of an alternative embodiment;

FIG. 6A" is an enlarged fragmentary cross section of a portion of a panel section of another alternative embodiment;

DETAILED DESCRIPTION

Figure 5:
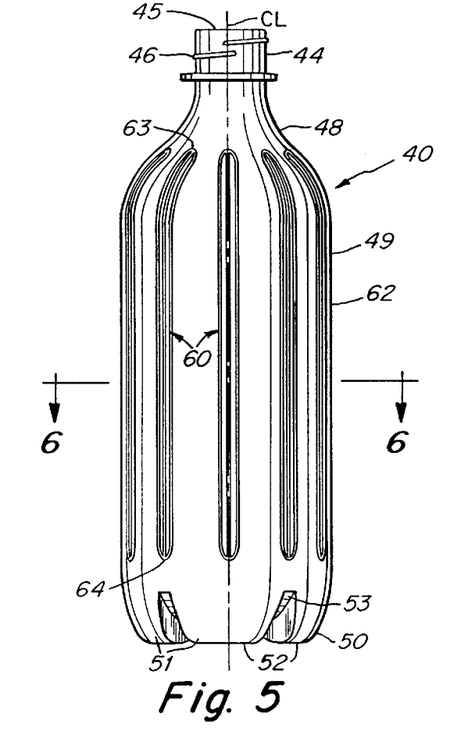
FIG. 5 is a front elevational view of a container according to a first embodiment of the present invention.
Figure 6:
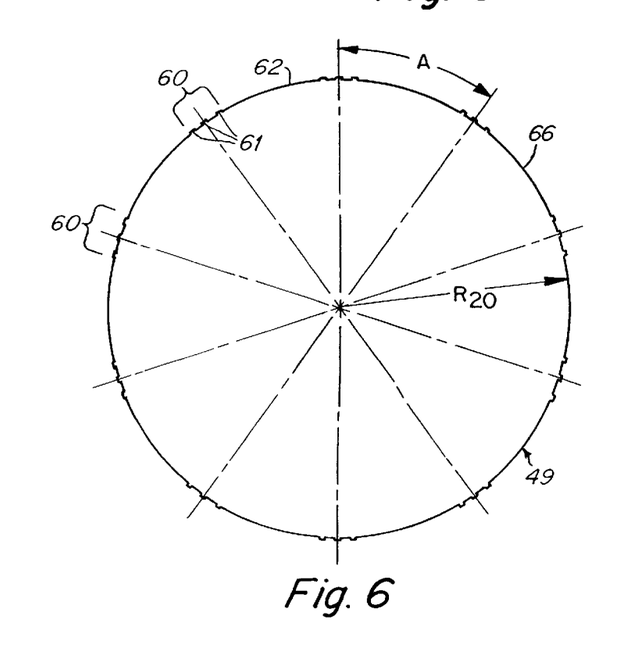
FIG. 6 is a schematic cross-sectional plan view taken along line 6—6 of FIG. 5, showing the panel circumference which is substantially unchanged before and after filling.

FIGS. 5–6 illustrate a first multilayer container embodiment of the present invention. This container 40 has a visual appearance very similar to the prior art containers 10, 20 of FIGS. 1–4, but without the large diameter ribs 12, 22 (of the prior containers) which creep and result in a loss of pressurization leading to a reduced shelf life. Instead, the container 40 has vertical scribe lines set in spaced apart groups of three, which converge at their upper and lower ends to provide a rib-like contour. The container circumference (which includes the scribe lines) undergoes significantly less creep and thus the container has an improved shelf life. In addition, the multilayer container 40 resists delamination.

Figure 5A:
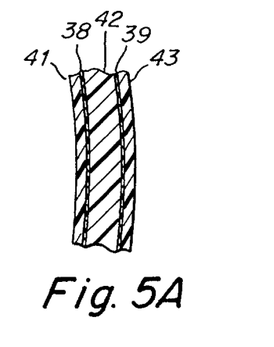
FIG. 5A is an enlarged fragmentary cross-section of a portion of the panel section of the container of FIG. 5, showing the multiple layers.

More specifically, container 40 (FIGS. 5–6) is a half-liter (½ L) container having a height of 7.250 inches (18.415 cm) and a maximum panel diameter of 2.820 inches (7.1628 cm). In this embodiment, the container has multiple layers 38, 39, 41, 42, 43 (see FIG. 5A) throughout substantially its entire length, including inner 41 and outer 43 layers of virgin bottle-grade homopolymer PET, a central core layer 42 of recycled post-consumer PET (PC-PET), and intermediate layers 38, 39 of EVOH (barrier material). The total wall thickness in the panel portion is 0.011 inches (0.028 cm); the inner and outer layers each have a thickness of 0.0024 inches (0.0061 cm), the core layer a thickness of 0.0058 inches (0.015 cm), and the barrier layers each have a thickness of 0.0002 inches (0.0005 cm). Note that in FIGS. 6–6A the multiple panel layers are not shown to simplify the drawings.

The container includes an upper neck finish 44 having an open top end 45, outer threads 46 for attachment of a screw-on cap (not shown), and a protruding flange 47 marking the lower end of the neck finish. Below the neck finish there is a shoulder portion 48 which increases in outer diameter moving downwardly towards a substantially cylindrical panel section 49. Below the panel section there is an integral footed base portion 50, including five downwardly protruding legs 51 which terminate in feet 52, upon which the bottle rests. In between the legs are substantially hemispherical portions 53. This type of bottle design for carbonated beverage containers is well-known in the art.

Figure 6A:
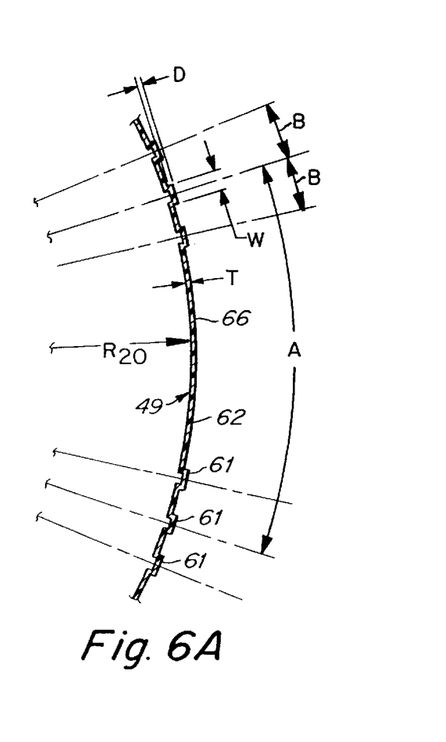
FIG. 6A is an enlarged fragmentary cross-section of a portion of the panel section seen in FIG. 6.
Figure 11:
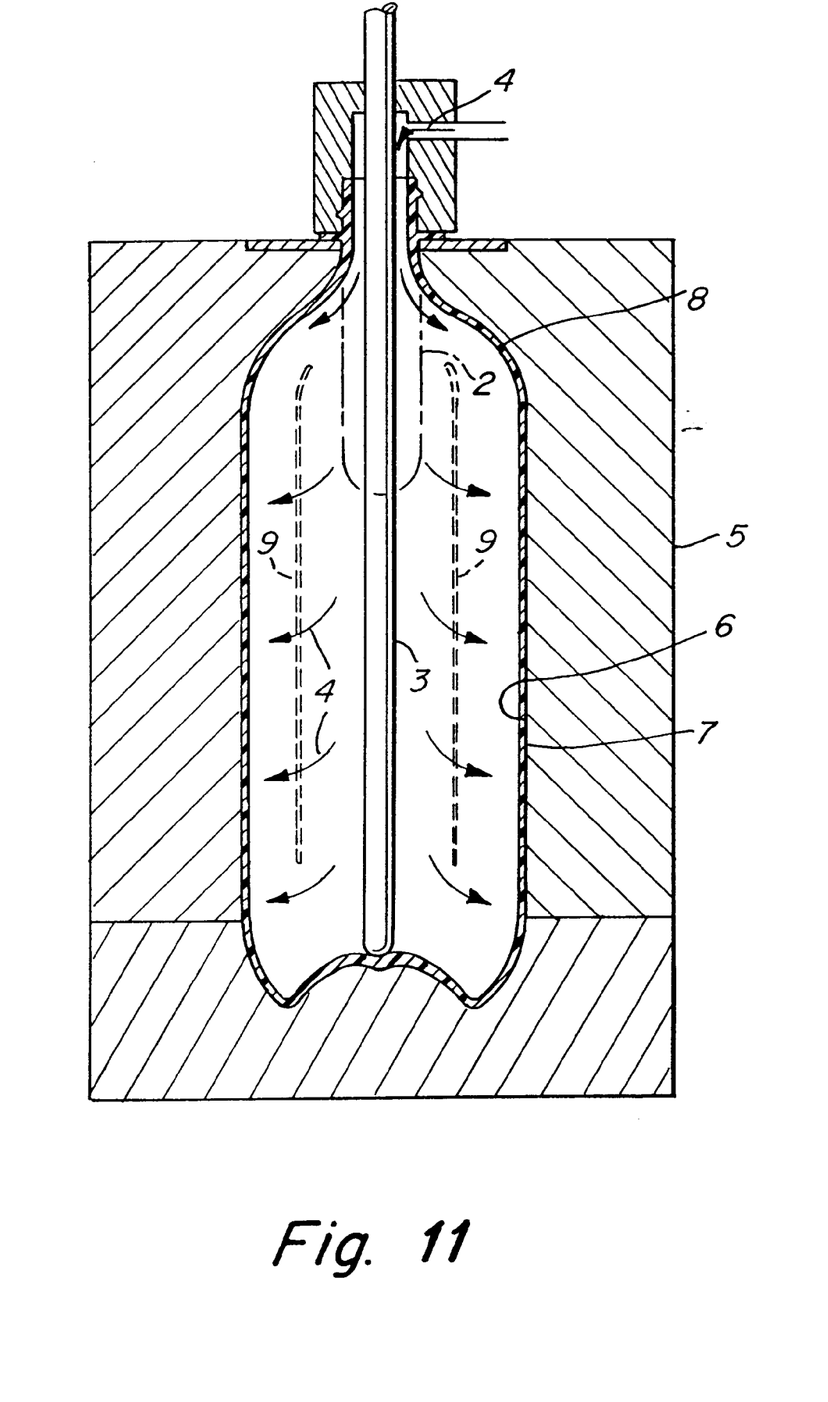
FIG. 11 is a cross-sectional view of a container blow mold.

According to the present invention, there are provided along substantially the entire length of the panel section and the lower half of the shoulder section, ten sets 60 of three vertical scribe lines 61 which provide a customized rib-like appearance to the container. The scribe lines, best shown in cross-section in FIGS. 6 and 6A, are formed in the blow mold by forming (e.g., cutting) narrow grooves (or scribe lines) in the metal cavity surface of the blow mold (see FIG. 11). A thermoplastic preform 2, as is known in the art, is heated and axially stretched (by stretch rod 3) and radially expanded (by a pressurized fluid 4) in the blow mold (5), whereupon the expanding preform wall contacts the mold cavity wall 6 and adopts the shape thereof. In this case, the panel 7 and shoulder 8 sections adopt the narrow lines or grooves 9 formed on the inner surface of the cavity, to form the slightly outwardly protruding scribe lines 61 on the outer surface 62 of the container.

In this embodiment, the vertical scribe lines are formed in sets of three, relatively closely spaced (proximal), and converge at their upper and lower ends 63, 64 to form a rounded contour. As shown in FIGS. 6 and 6A there are ten groups 60 of scribe lines, equally spaced about the panel circumference 66, the panel circumference is at radius $R_{20}$, and the lines extend a relatively small radial distance D outwardly from the panel circumference 66. The angular extent A between each set of scribe lines is about 36° (360÷10=36°); A is the distance between the center lines of adjacent sets, as shown. The distance between center lines of adjacent scribe lines (in a set) is defined by angular extent B, of about 5°. The width W of a particular scribe line is about 0.030 inches (0.076 cm). The radial depth D of the portion of the scribe line protruding from the panel circumference is about 0.005 inches (0.013 cm). The wall thickness T of the sidewall is about 0.011 inches (0.028 cm). The above-identified dimensions are representative of a particular container, but are not meant to be limiting.

The present half-liter container embodiment is designed to be filled with a carbonated beverage at 4.0 volumes (initial pressure of carbon dioxide in the liquid). It has been found that this container undergoes significantly less radial creep and thus has an extended shelf life (compared to prior containers of similar design with ribs). In this case, shelf life is defined as the time it takes for the sealed and pressurized container to undergo a predetermined maximum percentage loss of carbonation pressure. Furthermore, the container undergoes substantially no delamination which would result in loss of pressurization or transparency, during this time. For a monolayer container, a maximum carbonation pressure loss of no greater than 17.5% over 90 days is desirable; for multilayer containers, the same maximum pressure loss is achievable over 120 days, or more.

The use of scribe lines, instead of the prior art ribs, is particularly useful in containers having multiple layers and having a surface area to volume ratio of at least about 580 $cm^2/L$. Such containers typically have a volume of 1 liter (L) or less, and more particularly in the range of 0.75 to 0.20 L. Still more preferred is the use of scribe lines in containers of ½ liter or less, having a surface area to volume ratio of about 720 $cm^2/L$ or more. The wall thickness of such containers, made from a biaxially-oriented polymer such as polyester or the like, is in a range of about 0.008 to 0.016 inches (0.020 to 0.040 cm), and more preferably about 0.010 to 0.013 inches (0.025 to 0.033 cm). The average biaxial stretch ratio in the panel portion of the container is typically in the range of about 10–18, and more preferably about 12–15. Such containers exhibit an increase in diameter, in the container portion having scribe lines, of at least about 25% less, and more preferably at least about 40% less, compared to the same container portion with ribs.

The relative dimensions of the scribe lines will depend upon the panel section circumference, wall thickness, level of initial pressurization, and desired shelf life. In a preferred embodiment, a polyester container of the type just described preferably has scribe lines having a width W in a range of about 0.012 to 0.030 inches (0.030 to 0.076 cm) and a depth D in a range of about 0.002 to 0.004 inches (0.005 to 0.010 cm), in a panel section having a wall thickness T in a range of about 0.010 to 0.012 inches (0.025 to 0.030 cm).

FIG. 6A' shows a cross-sectional portion of an alternative panel section 49', wherein the scribe lines 61' have a rounded or wavy profile as opposed to the substantially rectangular profile in FIG. 6A. The rounded profile in FIG. 6A' will typically result from blow molding an orientable polymer such as PET, at a relatively high level of orientation, such as a biaxial stretch ratio of at least 12:1. The scribe lines are rounded, even when the narrow grooves in the mold cavity are substantially rectangular, because the polymer resists complete filling of the corners of the grooves, and has a tendency to rebound to some extent when the blowing pressure is released. For example, the narrow grooves in the mold cavity may have a width of 0.026 inches (0.066 cm) and a depth of 0.006 inches (0.015 cm), while the resulting scribe lines in the container have a lesser width of 0.024 inches (0.061 cm) and a lesser depth of 0.002 inches (0.005 cm), for a panel section having a wall thickness of 0.012 inches (0.030 cm). A rounded contour is more typically achieved with a width/thickness ratio of about 2; if the width/thickness ratio is increased to 6 or 7, it is more likely to obtain a rectangular profile (i.e., more complete filling of the corners) as shown in FIG. 6A. However, in addition to the dimensions of the scribe lines and mold, the resulting shape also depends upon the particular polymer and process conditions.

FIG. 6A" shows yet another alternative scribe line profile 61", in panel section 49", wherein the scribe line has a multi-faced shape. In this example, the scribe line has three flat faces, a bottom face and two opposed sidewall faces, each at an acute angle to the bottom face; this provides three reflecting surfaces for enhanced light reflection.

Various other alternative embodiments are shown in FIGS. 7–10.

Figure 7:
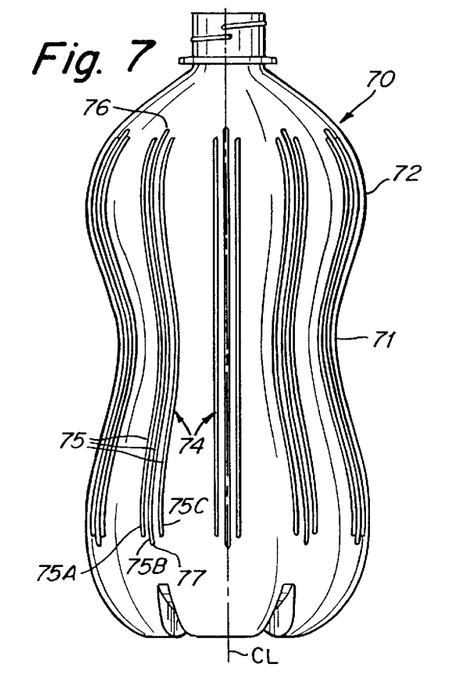
FIG. 7 is a front elevational view of a container according to a second embodiment of the present invention, having a waisted contour and spaced apart sets of three vertical scribe lines, the scribe lines in a set having different lengths which provide a rounded contour at the ends.

FIG. 7 shows an alternative container 70 having a waisted contour, i.e., a narrowing 71 in the panel circumference 72 at about the mid-panel height of the container. This type of feature is commonly used to customize a container's visual appearance. This container also includes ten sets 74 of vertical scribe lines 75, arranged in sets of three, similar to the embodiment of FIG. 5. However in this case, the upper and lower ends 76, 77 of each group of scribe lines do not converge, but rather the central scribe line 75B extends vertically further than the terminal ends of the outer two scribe lines 75A, 75C in the group. This staggered length profile at the upper and lower ends provides the visual appearance of a rounded end portion.

Figure 8:
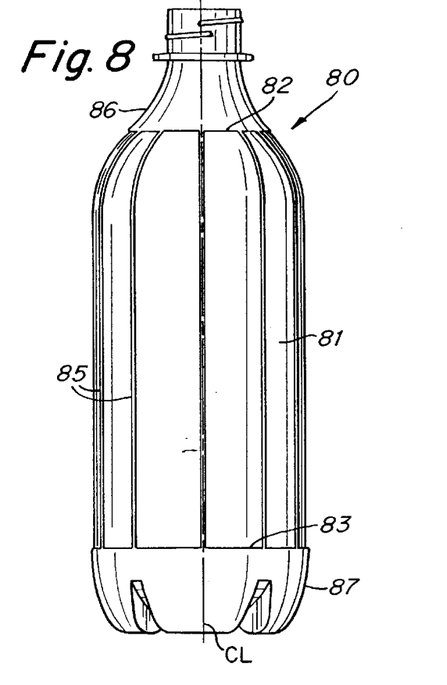
FIG. 8 is a front elevational view of a container according to another embodiment of the invention, having single spaced vertical scribe lines which merge with shoulder and base portions of the container.

FIG. 8 shows another embodiment in which a container 80 has a slightly recessed sidewall portion 81 extending from the middle of the shoulder to an upper base portion (upper and lower boundaries 82, 83). Within that recessed portion there are single spaced scribe lines 85 extending vertically from one end of the recessed portion to the other. The scribe lines are at the same circumference as the adjacent shoulder 86 and upper base 87 portions.

Figure 9:
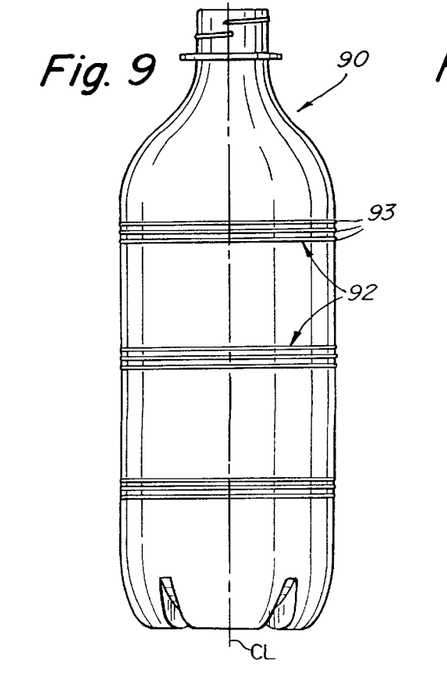
FIG. 9 is a front elevational view of a container according to another embodiment of the invention, having spaced apart sets of three scribe lines disposed horizontally in the panel section.

In yet another embodiment shown in FIG. 9, container 90 has three sets 92 of horizontal scribe lines, with three scribe lines 93 per set. Again, these provide the visual appearance of a wider rib, but with reduced creep and delamination.

Figure 10:
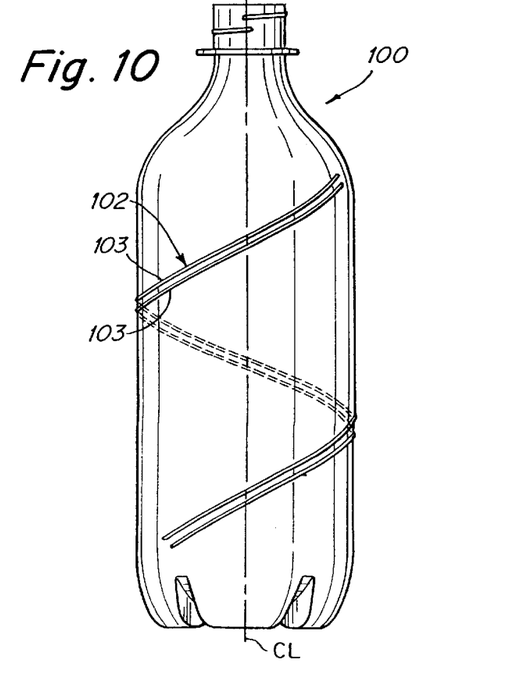
FIG. 10 is a front elevational view of a container according to another embodiment, having a pair of scribe lines forming a spiral around the panel section.

FIG. 10 shows yet another embodiment of a container 100 having a pair 102 of scribe lines 103 which spiral around the panel contour, being disposed at an angle to the container center line CL.

As shown, the scribe lines can have a variety of horizontal, vertical and diagonal alignments, groupings, and patterns, resulting in different visual effects. In a substantially transparent container, the narrow scribe lines refract light passing through the container sidewall, to a different degree than the adjacent portions of the sidewall. This difference in refraction gives the scribe line the appearance of a shadow, which can be used to form the visual appearance of either a protruding or recessed wide angle rib. Because the scribe lines are radially positioned outwardly (or inwardly) with respect to the panel circumference, the point of refraction is different with respect to adjacent portions of the panel circumference. As is known, refraction describes the deflection from a straight path undergone by a light ray or energy wave when passing obliquely from one medium (as air) into another (as plastic) in which its velocity is different.

ALTERNATIVE CONSTRUCTIONS AND MATERIALS

There are numerous preform and container constructions, and many different injection-moldable (thermoplastic) materials, which may be adapted for a particular food product and/or package, filling, and manufacturing process. Additional representative examples are given below.

Thermoplastic polymers useful in the present invention include polyesters, polyamides and polycarbonates. Suitable polyesters include homopolymers, copolymers or blends of polyethylene terephthalate (PET), polybutylene terephthalate (PBT), polypropylene terephthalate (PPT), polyethylene napthalate (PEN), and a cyclohexane dimethanol/PET copolymer, known as PETG (available from Eastman Chemical, Kingsport, Tenn.). Suitable polyamides (PA) include PA6, PA6,6, PA6,4, PA6,10, PA11, PA12, etc. Other useful thermoplastic polymers include acrylic/imide, amorphous nylon, polyacrylonitrile (PAN), polystyrene, crystallizable nylon (MXD-6), polyethylene (PE), polypropylene (PP), and polyvinyl chloride (PVC).

Polyesters based on terephthalic or isophthalic acid are commercially available and convenient. The hydroxy compounds are typically ethylene glycol and 1,4-di-(hydroxy methyl)-cyclohexane. The intrinsic viscosity for phthalate polyesters are typically in the range of 0.6 to 1.2, and more particularly 0.7 to 1.0 (for O-chlorphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Post-consumer PET (PC-PET) is a type of recycled PET prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a relative humidity of less than 0.25%, and the following levels of contaminants:

PVC: <100 ppm aluminum: <50 ppm olefin polymers (HDPE, LDPE, PP): <500 ppm paper and labels: <250 ppm colored PET: <2000 ppm other contaminants: <500 ppm PC-PET may be used alone or in one or more layers for reducing the cost or for other benefits.

Also useful as a base (structural) polymer or as a thermal-resistant and/or high-oxygen barrier layer is a packaging material with physical properties similar to PET, namely polyethylene naphthalate (PEN). PEN provides a 3–5× improvement in barrier property and enhanced thermal resistance, at some additional expense. Polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Amoco Chemical Company, Chicago, Ill. PEN has a glass transition temperature $T_g$ of about 123° C., and a melting temperature $T_m$ of about 267° C.

Oxygen barrier layers include ethylene/vinyl alcohol (EVOH), PEN, polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V. = (\ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The blown container body should be substantially transparent. One measure of transparency is the percent haze for transmitted light through the wall ($H_T$) which is given by the following formula:

$$H_T = [Y_d \div (Y_d + Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container body should have a percent haze (through the panel wall) of less than about 10%, and more preferably less than about 5%.

The preform body-forming portion should also be substantially amorphous and transparent, having a percent haze across the wall of no more than about 10%, and more preferably no more than about 5%.

The container will have varying levels of crystallinity at various positions along the height of the bottle from the neck finish to the base. The percent crystallinity may be determined according to ASTM 1505 as follows:

$$\% \text{ crystallinity} = [(ds-da)/(dc-da)] \times 100$$

where ds=sample density in g/cm³, da=density of an amorphous film of zero percent crystallinity, and dc=density of the crystal calculated from unit cell parameters. The panel portion of the container is generally stretched the greatest and therefore would have the highest average percent crystallinity.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As a further alternative embodiment, the preform may include one or more layers of an oxygen scavenging material. Suitable oxygen scavenging materials are described in U.S. Ser. No. 08/355,703 filed Dec. 14, 1994 by Collette et al., entitled "Oxygen Scavenging Composition For Multilayer Preform And Container," which is hereby incorporated by reference in its entirety. As disclosed therein, the oxygen scavenger may be a metal-catalyzed oxidizable organic polymer, such as a polyamide, or an anti-oxidant such as phosphite or phenolic. The oxygen scavenger may be mixed with PC-PET to accelerate activation of the scavenger. The oxygen scavenger may be advantageously combined with other thermoplastic polymers to provide the desired injection molding and stretch blow molding characteristics for making substantially amorphous injection-molded preforms and substantially transparent biaxially-oriented polyester containers. The oxygen scavenger may be provided as an interior layer to retard migration of the oxygen scavenger or its byproducts, and to prevent premature activation of the scavenger.

There is described in U.S. Pat. No. 4,609,516 to Krishnakumar et al. a method for forming multilayer preforms in a single injection mold cavity. In that method, successive (sequential) injections of different thermoplastic materials are made into the bottom of the mold cavity. The materials flow upwardly to fill the cavity and form for example a five-layer structure across the sidewall. This five-layer structure can be made with either two materials (i.e., the first and third injected materials are the same) or three materials (i.e., the first and third injected materials are different). Both structures are in widespread commercial use for beverage and other food containers.

An example of a two-material, five-layer (2M, 5L) structure has inner, outer and core layers of virgin polyethylene terephthalate (PET), and intermediate barrier layers of ethylene vinyl alcohol (EVOH). An example of a three-material, five-layer (3M, 5L) structure has inner and outer layers of virgin PET, intermediate barrier layers of EVOH, and a core layer of recycled or post-consumer polyethylene terephthalate (PC-PET). Two reasons for the commercial success of these containers are that: (1) the amount of relatively expensive barrier material (e.g., EVOH) can be minimized by providing very thin intermediate layers; and (2) the container resists delamination of the layers without the use of adhesives to bond the dissimilar materials. Also, by utilizing PC-PET in the core layer, the cost of each container can be reduced without a significant change in performance.

The ability to withstand pressure with reduced creep and without delamination may be particularly useful in containers exposed to high temperatures, such as refill, hot-fill and pasteurizable containers.

These and other modifications of the present invention will be apparent to those skilled in the art, and are intended to be included within the scope of the present invention.

What is claimed is:

1. A method of reducing creep in a pressurized plastic container, comprising:
   eliminating any wide-width ribs which exhibit creep under pressure, and blow molding at least one scribe line which gives a visual appearance of a rib while providing substantially reduced creep, wherein the at least one scribe line has a width in the range of about 0.012 to 0.040 inches (0.030 to 0.100 cm).

2. A plastic carbonated beverage container having a container portion with a wall thickness T in a range of from about 0.008 to 0.016 inches (0.020 to 0.040 cm), the container portion having at least one blow molded scribe line which gives a visual appearance of a rib, wherein the at least one scribe line has a width in the range of about 0.012 to 0.040 inches (0.030 to 0.100 cm).

3. The container of claim 2, having a surface area to volume ratio of at least about 580 $cm^2/L$.

4. The container of any one of claims 1, 2 or 3, wherein the at least one scribe line is provided in a multilayer wall portion of the container.

5. The container of claim 4, wherein the container has a volume of no greater than 1 liter.

6. The container of claim 4, wherein the container has a volume of no greater than ½ liter.

7. The container of claim 3, having a maximum pressure loss of 17.5% over a period of 90 days.

8. The container of any one of claims 2 or 3, wherein the at least one scribe line has a depth in a range of about 0.002 to 0.004 inches (0.005 to 0.010 cm).

9. The container of claim 8, wherein the plastic is selected from the group consisting of polyethylene terephthalate (PET) and polyethylene naphthalate (PEN), including homopolymers, copolymers and blends thereof.

10. The container of claim 8, wherein the container includes at least one layer of a material selected from the group consisting of polyethylene terephthalate (PET) and polyethylene naphthalate (PEN), including homopolymers, copolymers and blends thereof, barrier materials, thermal-resistant materials, and recycled materials.

11. The container of claim 1, having a container portion with a wall thickness of from about 0.008 to 0.016 inches (0.020 to 0.040 cm), and the container having a maximum pressure loss of 17.5% over a period of 90 days.

12. The container of any one of claims 7 or 11, wherein the scribe line has a radial depth D of from about 0.001 to 0.010 inches (0.00254 to 0.0254 cm).

13. The container of claim 12, wherein there are a plurality of scribe lines grouped in substantially parallel relation and in proximity to one another to form a set having the appearance of a rib.

14. The container of claim 13, wherein the opposing ends of the set of scribe lines each have the appearance of a curved contour.

15. The container of any one of claims 7 or 11, wherein the scribe line has a width W and wherein a ratio W:T is in the range of from about 1.5:1 to 3.0:1.

16. The container of any one of claims 7 or 11, wherein the at least one scribe line has a width of from about 0.012 to 0.030 inches (0.030 to 0.076 cm) and a radial depth of about 0.002 to 0.004 inches (0.005 to 0.010 cm) and the container portion wall thickness T is from about 0.010 to 0.012 inches (0.025 to 0.030 cm).

17. The container of any one of claims 7 or 11, wherein the container includes layers formed from at least one of:

(a) a thermoplastic structural polymer;
   (b) a gas barrier polymer;
   (c) a scavenging polymer; and
   (d) a thermal resistant polymer.

18. The container of any one of claims 7 or 11, wherein the container includes multiple layers without adhesives so that the layers readily separate for recycling.

19. The container of any one of claims 1 or 2, wherein the container has a plurality of scribe lines grouped in substantially parallel relation and in proximity to one another to form a set having the appearance of a rib.

20. The container of claim 19, wherein the opposing ends of each set of scribe lines has the appearance of a curved contour.

21. The container of claim 20, wherein the ends converge toward a central scribe line in the set to provide the curved contour.

22. The container of claim 19, wherein the scribe lines in the set are of different lengths to form the curved contour.

23. The container of claim 19, wherein the scribe lines have opposing ends which merge with upper and lower container portions disposed at a same radial distance from a container center line.

24. The container of claim 19, wherein the set includes three scribe lines.

25. The container of any one of claims 1 or 2, wherein the at least one scribe line has a radial depth D of from about 0.001 to 0.010 inches (0.00254 to 0.0254 cm).

26. The container of claim any one of claims 1 or 2, wherein the container has a plurality of scribe lines which form sets of three, closely spaced and substantially parallel, scribe lines including a central line between two outer lines, and wherein each set has an angular extent measured as a distance between the center points of the two outer lines in a range of from about 3 to 10°.

27. A pressurized plastic container having a plurality of scribe lines of a narrow width W which give a visual appearance of ribs, in a container portion having a wall thickness T, wherein a ratio of W:T is in the range of from about 1.5:1 to 3.0:1.

28. The container of claim any one of claims 2 or 27, wherein the container portion has been biaxially oriented at an average stretch ratio of from about 10 to 18.

29. The container of claim 27, wherein the width W is in the range of about 0.012 to 0.040 inches (0.030 to 0.100 cm).

30. The container of any one of claims 27 or 29, wherein each of the plurality of scribe lines has a radial depth D of from about 0.001 to 0.010 inches (0.00254 to 0.0254 cm).

31. The container of claim 30, wherein the depth D is in a range of about 0.002 to 0.004 inches (0.005 to 0.010 cm).

32. The container of claim 31, wherein the wall thickness T is in a range of from about 0.008 to 0.016 inches (0.020 to 0.040 cm).

33. The container of claim 27, wherein the container wall portion is multilayer.

34. The container of claim 33, wherein the container includes layers formed from at least one of:

(a) a thermoplastic structural polymer;
   (b) a gas barrier polymer;
   (c) a scavenging polymer; and
   (d) a thermal resistant polymer.

35. The container of claim 33, wherein the multilayer wall portions comprise materials which will readily separate into multiple layers for recycling.

36. The container of claim 27, wherein the container has a volume of no greater than 1 liter.

37. The container of claim 36, wherein the container has a volume of no greater than ½ liter.

38. The container of claim 27, wherein the plurality of scribe lines are formed in sets, each set comprising scribe lines grouped in substantially parallel relation and in proximity to one another to form the appearance of a rib.

39. The container of claim 38, wherein each set is formed of three scribe lines including a central line between two outer lines, and wherein each set has an angular extent measured as a distance between the center points of the two outer lines in a range of from about 3 to 10.

40. The container of any one of claims 38 or 39, wherein the opposing ends of the set of scribe lines have the appearance of a curved contour.

41. The container of claim 27, wherein the container portion has been biaxially oriented at an average stretch ratio of from about 10 to 18.

42. The container of claim 27, wherein the wall thickness is from about 0.008 to 0.016 inches (0.020 to 0.040 cm), and the container has a maximum pressure loss of 17.5% over a period of 90 days.

43. The container of claim 42, wherein the width W is from about 0.012 to 0.040 inches (0.030 to 0.100 cm) and each of the plurality of scribe lines has a radial depth D of from about 0.001 to 0.010 inches (0.00254 to 0.0254 cm).

44. The container of claim 27, wherein the width W is of from about 0.012 to 0.030 inches (0.030 to 0.076 cm), the wall thickness T is from about 0.010 to 0.012 inches (0.025 to 0.030 cm), and each of the plurality of scribe lines has a radial depth of about 0.002 to 0.004 inches (0.005 to 0.010 cm).

* * * * *